United States Patent [19]

Iguchi et al.

[11] Patent Number: 4,977,558
[45] Date of Patent: Dec. 11, 1990

[54] DEMULTIPLEXING DEVICE OF SYNCHRONOUS MULTIPLEXING SYSTEM

[75] Inventors: Kazuo Iguchi, Yokohama; Tetsuo Soejima, Tama; Toshiaki Watanabe, Kawasaki; Shigeo Amemiya, Yokohama, all of Japan

[73] Assignee: Fujitsu Limited, Kawasaki, Japan

[21] Appl. No.: 485,833

[22] Filed: Feb. 28, 1990

Related U.S. Application Data

[63] Continuation of ser. No. 199,042, filed as PCT JP87/00634 on Aug. 27, 1987, published as WO88/01815 on Mar. 10, 1988, abandoned.

[30] Foreign Application Priority Data

Aug. 30, 1986 [JP] Japan ................ 61-204739
Aug. 30, 1986 [JP] Japan ................ 61-204740

[51] Int. Cl.⁵ ........................... H04J 3/06; H04J 3/12
[52] U.S. Cl. ........................ 370/112; 370/100.1; 370/110.1
[58] Field of Search ............. 370/112, 110.1, 100.1

[56] References Cited

U.S. PATENT DOCUMENTS

| | | | |
|---|---|---|---|
| 4,382,297 | 5/1983 | Farrow | 370/112 |
| 4,719,624 | 1/1988 | Bellisio | 370/112 |
| 4,744,082 | 5/1988 | Fujimura et al. | 370/112 |
| 4,764,921 | 8/1988 | Graves et al. | 370/100 |
| 4,771,426 | 9/1988 | Rattingourd et al. | 370/100 |

Primary Examiner—Douglas W. Olms
Assistant Examiner—Min Jung
Attorney, Agent, or Firm—Staas & Halsey

[57] ABSTRACT

A circuit which operates at the fixed timing and discriminates the control signal is provided and the timing pulse for demultiplexing is controlled in accordance with the discriminated control signal in the receiving part of the synchronized multiplexing system in which the basic signals are generated by inserting the control signal required for multiplexing on the frame structure of basic signal rate and the high level multiplexing signal is formed by multiplexing such basic signals, thereby stable correspondence between the channel at the time of multiplexing in the sending side and the channel after the demultiplexing in the receiving side can be ensured.

11 Claims, 6 Drawing Sheets

DEMULTIPLEXING DEVICE OF SYNCHRONOUS MULTIPLEXING SYSTEM

This is a continuation of copending application(s) Ser. No. 07/199,042 filed as PCT JP87/00634 on Aug. 27, 1987, published as WO88/01815 on Mar. 10, 1988, now abandoned.

TECHNICAL FIELD

The present invention relates to a multiplexing system of PCM signals, and particularly to a synchronous multiplexing system to multiplex a basic signal in an integer multiple of the basic signal rate.

BACKGROUND ART

In the conventional multiplexing system based on an asynchronous PCM hierarchy, it has been very difficult to directly extract desired signal from a multiplexed group signal and output it for transmitting and exchanging a broad band signal such as a video signal, because the time slot of each signal in the multiplexed group signal is not fixed. With spreading of the broadband service network, it is now discussed to construct a synchronous network using a high order PCM hierarchy to reduce the influence of jitter, etc. Under such condition, it is also discussed to employ the synchronous multiplexing system in which the basic signal rate of broadband ISDN (Integrated Services Digital Network) is selected to several tens of M bps and the multiplexing PCM hierarchy is set to an integer multiple of this basic rate.

Since the multiplexing hierarchy is set to an integer multiple of the basic signal rate in this synchronous multiplexing system, an extra signal (such as frame synchronization signal, control signal, etc.) is not inserted in the unit of multiplexing. Therefore the control signal, etc. which is required for multiplexing is prepared based on the basic signal frame and the multiplexing is carried out by using such control signal region. Thereby, structure of multiplexing part which is required to have high speed characteristic is very much simplified (can be formed only by the parallel-to-serial (P/S) convertion, serial-to-parallel (S/P) conversion), and it is possible to employ the structure which is just suited to high speed processing because it is enough to execute the frame synchronizing processing and control processing of channel switching part for multiplexing channel correspondence at the basic signal rate. Here, the channel switching is carried out to set the correspondence of channels through the channel switching because the channel number at the time of multiplexing does not always match the channel number after multiplexing since the high speed multiplexing part has the function of only the P/S conversion, S/P conversion.

However, this structure does not result in any problem when service is provided at a rate under the basic signal rate, namely such structure is used as a pipe-line, but it probably generates a phase difference on the basic signal frame after the demultiplexing in the wide area service where a plurality of basic signal frames must be used in concatenation. Therefore, there is a need to develop a synchronized multiplexing system which does not generate such a phase difference.

In the synchronous multiplexing system of the prior art, channel correspondence has been established by discriminating the multiplexing control signal written in the basic signal frame after demultiplexing and controlling the channel switching part located immediately after a latch circuit for demultiplexing based on such discrimination result.

FIG. 1 is a frame structure of the basic signal. As indicated in this figure, the frame structure comprises a control signal and information signal (D) and the control signal is formed by the frame synchronization signal (F), multiplexing control signal (ID) and maintenance supervisory signal, etc.

FIG. 2 is an example of the structure of a synchronized multiplexing device of the prior art. In the sending side, the particular multiplexing channel numbers are respectively written to the multiplexing control signal ID for the basic signal FB of respective channels CH1, CH2, ..., CHn in the discrimination signal writing parts $l_1, l_2, ..., l_n$ of each channel of the multiplexing part. In the P/S converting part 2, the basic signal of each channel to which the multiplexing channel numbers are written is converted a serial signal from a parallel signal to generate the multiplexing signal nFB. The control part (CONT) 3 controls the operation timing of respective portions of the multiplexing part. The multiplexing signal nFB in the output of the P/S converting part 2 is sent to the receiving side through the transmission line 4.

In the receiving side, the input multiplexing signal is converted to a parallel signal from the serial signal by a S/P converting part 5 in the demultiplexing part. Thereby, such signal is isolated to the signals SR1, SR2, ..., SRn having different timings. These signals are latched in accordance with the timing signal of a counter 7 to generate the basic signals CH1', CH2', ... CHn' through a speed conversion. With such timing, multiplexing channel numbers of the basic signals of each channel do not always correspond to those in the sending side.

A multiplexing channel number discriminating part (FSYNC, ID DET) 8, sets frame synchronization. For example, CHn' of particular channel and the multiplexing channel number is also discriminated. A switch part 9 is then controlled and the sequence of basic signals of respective channels is replaced so that the discriminated multiplexing channel numbers match the the intrinsic multiplexing channel numbers of the pertaining channel. Thereby, the output signal having the channel numbers CH1, CH2, ..., CHn correspond to the channel number at the time of multiplexing in the sending side can be obtained.

Since the structure of synchronized multiplexing device indicated in FIG. 2 is intended to use the basic signal as the pipe, in case a plurality of basic signal frames are used in concatenation, phase adjustment is necessary among a plurality of channels because the phase relation of respective channels does not always match the phase relation before multiplexing.

Namely, if three basic signals with a basic signal rate of 50 Mbps are used in concatenation, for example, and a signal of 150 Mbps is transmitted, then the following cases occur depending on the structure of a network.

1. Three coupled basic signals are transmitted respectively by different routes and frame phase differences are generated among the three basic signals due to path delay time differences.

2. Even when three basic signals are transmitted by the same multiplexing transmission line, frame phase difference is generated between the coupled basic signals depending on the method of multiplex isolation.

The problem 1 can be solved ,by controlling the network so that the three basic signals are sent on the same transmission line. However, the problem 2 cannot be solved by the conventional demultiplexing method.

FIG. 3 is a time chart of demultiplexing in a conventional synchronous multiplexing device. An input data multiplexed in FIG. 3 generates the outputs sequentially with delay of a bit at the outputs SR1, SR2, ..., SRn of the S/P converter 5. The latch part 6 latches these signals in accordance with a fixed timing signal PH1 of a counter 7 to change the speed and isolate the signals to the basic signals CH1', CH2', ..., CHn'. Since this basic signal does not correspond to the sending side in the channel number, the channels are replaced at the switch part 9 by discriminating the multiplexed channel numbers in order to set again the channel number correspondence. In this case, it is probable, as indicated in FIG. 3, that a phase difference of one bit is generated in each channel output.

Therefore, phase control is necessary among respective channels coupled by inserting a function to give or eliminate delay of one bit in the output of a switch part. Otherwise, if a video signal is transmitted as the sending signal, it is also probable that MSB (Most Significant Bit) and LSB (Least Significant Bit) in a byte of an output signal may be replaced due to the difference of one bit. In this case, the reproduced information of image data becomes useless.

SUMMARY OF THE INVENTION

It is an object of the present invention to provide a demultiplexing device which does not require phase difference adjustment of data among the channels and channel replacement in a demultiplexing device when certain data is transmitted using a plurality of basic signal channels in a multiplexing system for multiplexing a basic signal frame with a signal rate equal to an integer time of the speed of the basic signal.

It is another object of the present invention to simplify the processing which realizes synchronization and channel discrimination at a rate of respective basic signals when isolating and latching a signal into basic signals in a receiving side.

Basically, in the present invention the basic signals are generated by inserting a control signal required for multiplexing in a frame structure of a basic signal rate. A high level multiplexing signal is formed by multiplexing such basic signals and a circuit operates at a fixed timing to discriminate the control signal. Timing pulses for demultiplexing are controlled in accordance with a discriminated control signal in the receiving part of the synchronous multiplexing system. Thereby stable correspondence in a channel multiplexed in the sending side and the channel after demultiplexing in the receiving side can be ensured.

In a modification of the present invention, the channel synchronization is set between the basic signal during multiplexing in the sending side and the basic signal after demultiplexing in the receiving side by discriminating the multiplexing channel number a particular channel and shifting the phase of a timing signal for demultiplexing so that such multiplexing channel number matches the multiplexing channel number for the particular channel.

DESCRIPTION OF THE PREFERRED EMBODIMENTS

Figure 1:
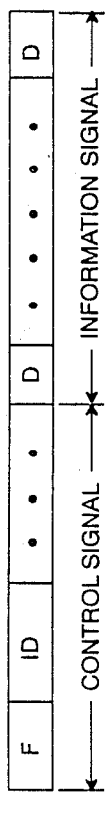
FIG. 1 is a frame structure of the basic signals as the background of the present invention.
Figure 2:
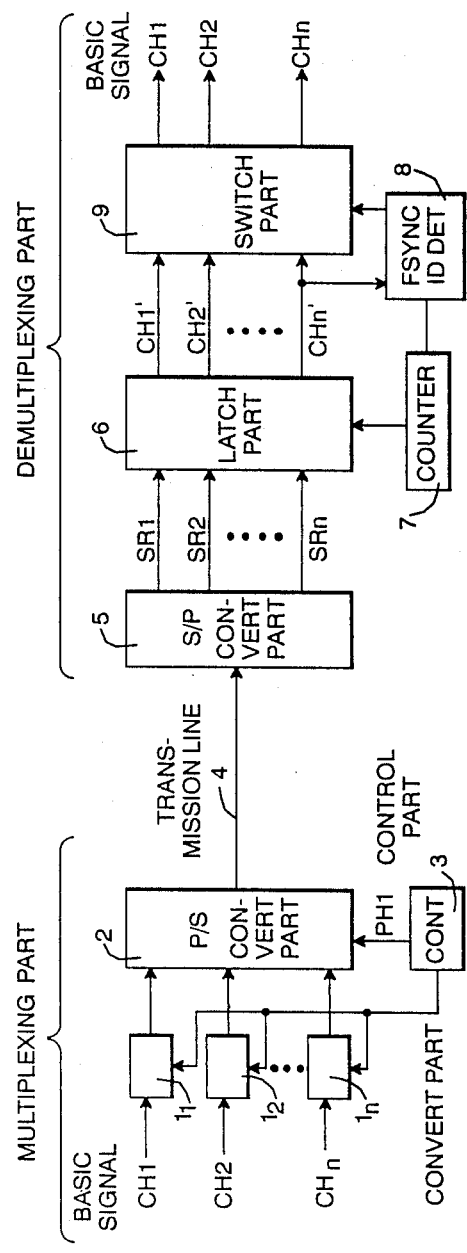
FIG. 2 is a structure of synchronized multiplexing system of the prior art.
Figure 3:
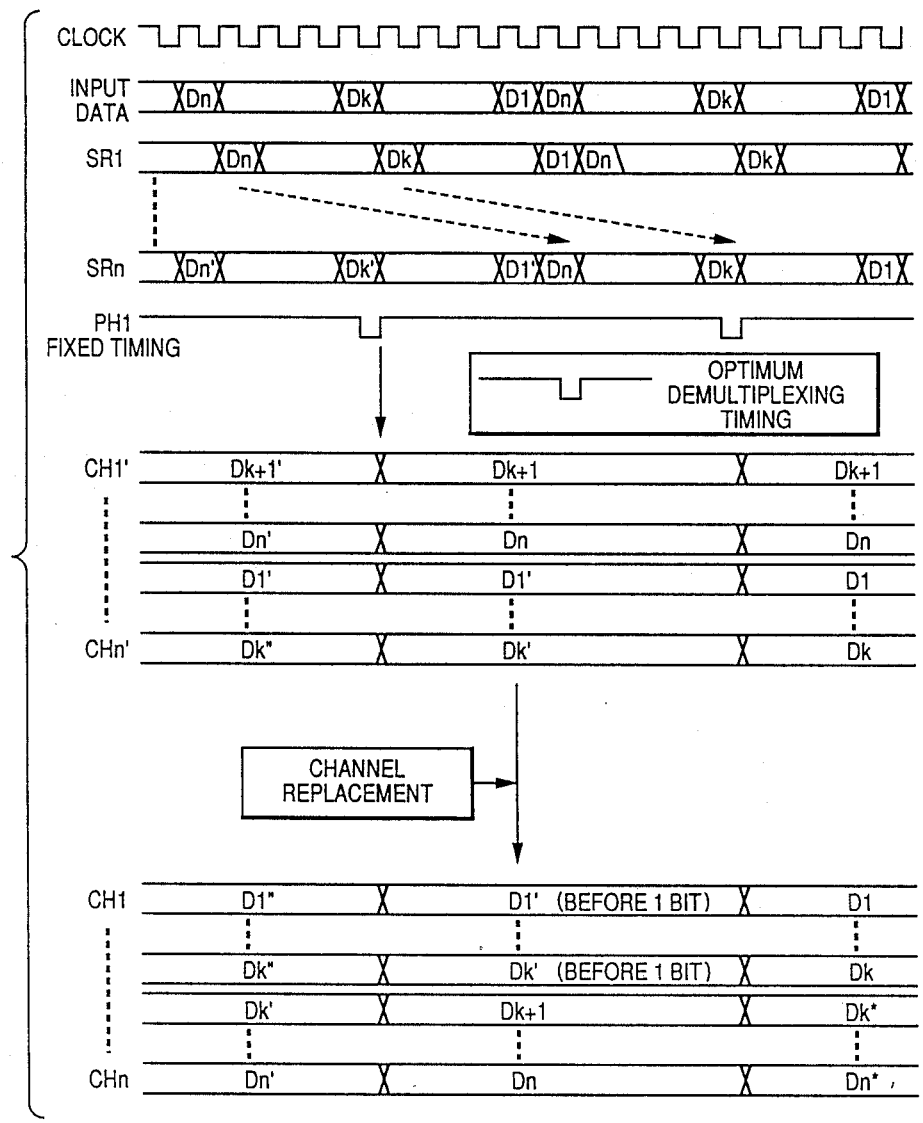
FIG. 3 is a timechart for the demultiplexing device of the synchronized multiplexing system of the prior art.
Figure 4:
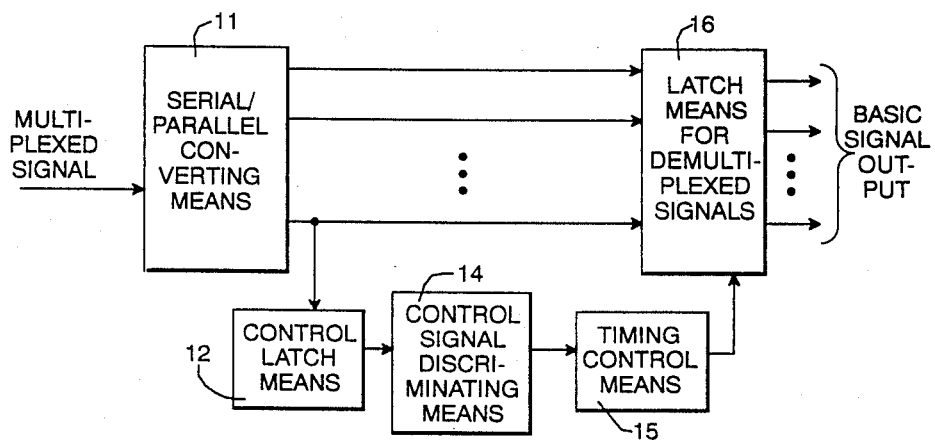
FIG. 4 is a principle structure of a first embodiment of the demultiplexing device of the present invention.

FIG. 4 is a principle structure of a first embodiment of the demultiplexing device of the present invention. Disclosed herein is a demultiplexing device in a synchronized multiplexing system in which a control signal including the multiplex channel numbers exists in a basic signal frame and the synchronized basic signals are multiplexed into a signal having a equal to an integer time of the rate of the basic signals. The device comprises a serial/parallel converting means 11, a control latch means 12, a control signal discriminating means 14, a timing control means 15 and a latch means 16 for demultiplexed signals.

The serial/parallel converting means 11 converts the input multiplexing signal into a parallel signal from a serial signal and sequentially generates parallel signal outputs of multiplexing channels having different timings.

The control latch means 12 latches the signal of a particular channel from the output of serial/parallel converting means 11.

The control signal discriminating means 14 discriminates the multiplexing channel numbers of signals of a particular channel latched by the control latch means 12 and detects a difference from the multiplex channel number to which the control latch means 12 is connected.

The timing control means 15 generates a timing signal having a timing difference corresponding to the difference of the multiplexing channel number for the latch timing in the control latch means 12.

The latch means 16 for demultiplexed signals generates a number of basic signal outputs corresponding to the number of multiplexing channels by latching an output of the serial/parallel converting means 11 with the timing signal of timing control means 15.

In the demultiplexing system of the present invention, control is carried out so that the channel number during multiplexing corresponds to the channel number after demultiplexing by discriminating the channel number in the basic signal frame of particular channel with an output obtained by latching a particular channel with a fixed timing in the control latch means. The channel number is compared with the particular channel number to which the control latch means for control is connected and the latch circuit for demultiplexed signals is controlled in accordance with the difference between the channel numbers.

Figure 5:
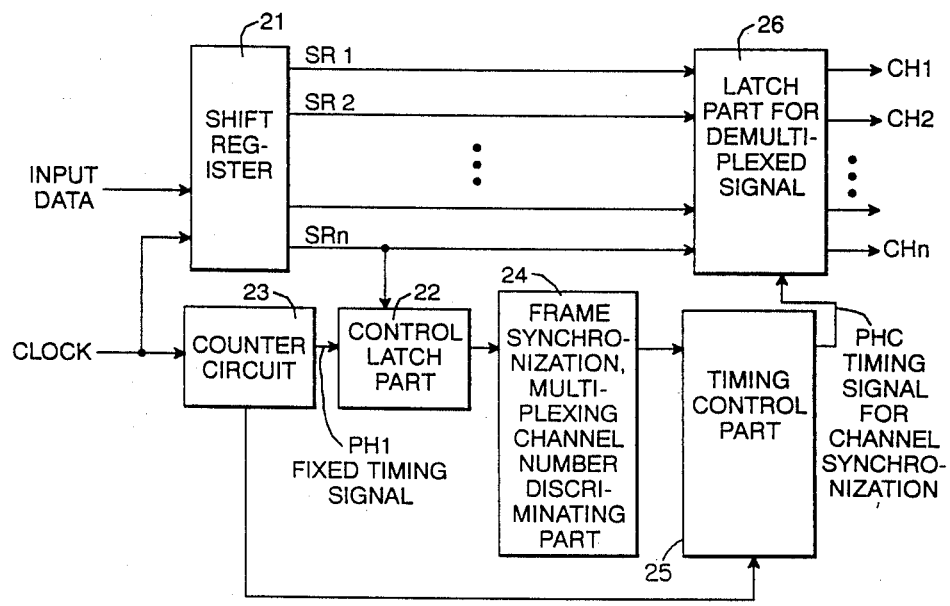
FIG. 5 is a detail structure of the first embodiment of the present invention.

The first embodiment of the present invention is explained further with reference to the detail structure of FIG. 5. In FIG. 5, 21 is a shift register; 22 is a control latch part; 23 is a counter circuit; 24 is a frame synchronization, multiplex channel number discriminating part; 25 is a timing control part; 26 is a latch part for demultiplexed signals.

Figure 6:
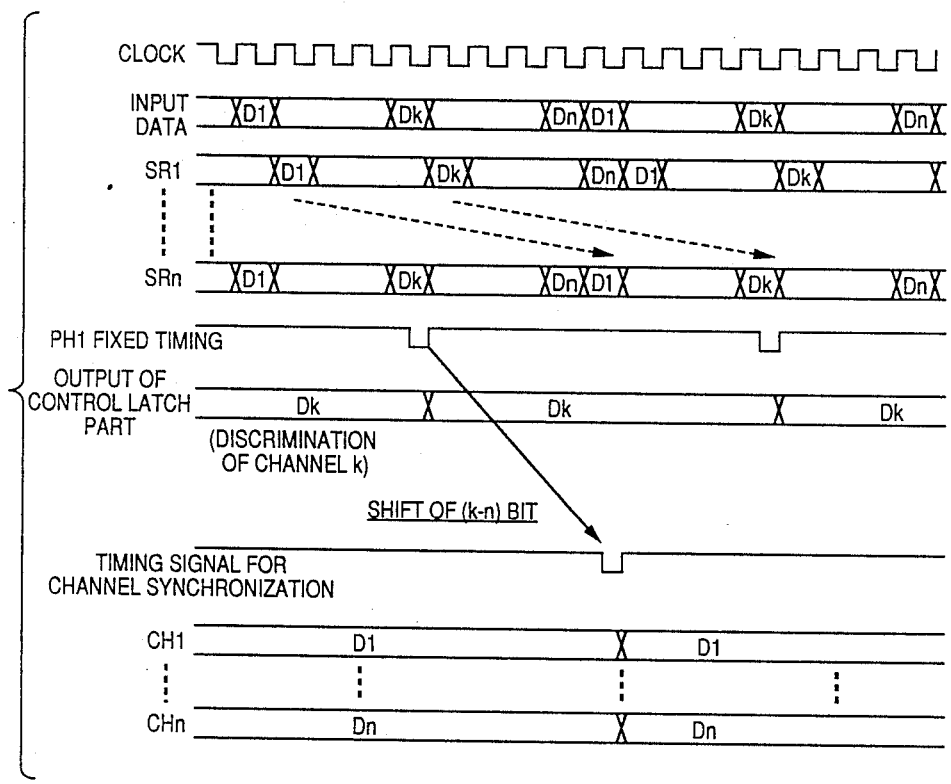
FIG. 6 is a timechart for multiplex isolation in the embodiment of FIG. 5.

FIG. 6 is a timechart for multiplex isolation in the embodiment of FIG. 5.

A multiplexed input data is read into the shift register 21 in accordance with the clock and thereby the outputs SR1, SR2, . . . , SRn which are each shifted by one bit sequentially, are generated in parallel. The control latch part 22 latches an output of a particular channel, for instance, SRn in accordance with a fixed timing signal PH1 of the counter circuit 23 which counts up the clock and generates an output. The frame synchronization, multiplexing channel number discriminating part 24 establishes frame synchronization for the output of control latch part 22 and discriminates its multiplexing channel number.

If the discrimination result is a multiplexing channel number k, it is shifted by k-n bits for the multiplexing channel number in the sending side. Therefore, the timing control part 25 generates the demultiplex timing signal PHC which is shifted by k-n bits from the write clock in the shift register 21 for channel synchronization and applies it to the latch part 26 for demultiplexed signals. The latch part 26 for demultiplexed signals outputs basic signals CH1, CH2, . . . ,CHn having the channel numbers corresponding to the channel number at the time of multiplexing in the sending side by executing a speed conversion after latching an output of the shift register 21 in accordance with PHC.

Figure 7:
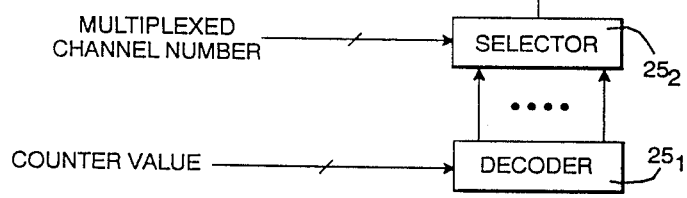
FIG. 7 is a structure of an embodiment of the timing control part of FIG. 5.
Figure 8:
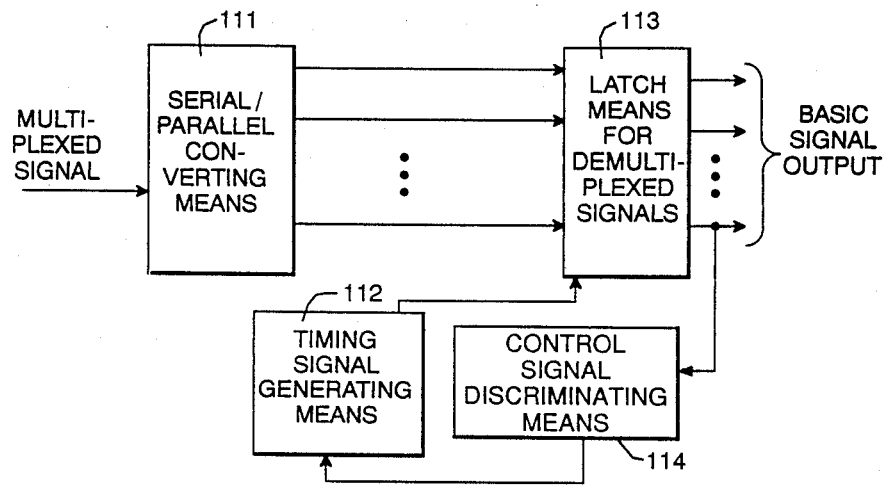
FIG. 8 is a principle structure of a second embodiment of the demultiplexing device of the present invention.

FIG. 7 indicates an example of the structure of timing control part 25. The decoder 25₁ decodes a counted value sent from the counter circuit 23, while the selector 25₂ generates the channel synchronization timing signal PHC by selecting an output of the decoder 25₁ in accordance with the multiplexing channel number discriminated in the frame synchronization, multiplexing channel number discrimination part 24. Second embodiment:

The principle structure of the demultiplexing device of the second embodiment of the present invention is indicated in FIG. 8. In FIG. 8, a demultipexing device in the synchronized multiplexing system in which a control signal including the multiplex channel numbers exists in the basic signal frame and the synchronized basic signals are multiplexed into a signal having a rate equal to an integer time of the rate of the basic signals. The device of the second embodiment comprises a serial/parallel converting means 111, a timing signal generating means 112, a latch means 113 for demultiplexed signals and a control signal discriminating means 114.

The serial/parallel converting means 111 converts the input multiplexing signal into a parallel signal from a serial signal and sequentially generates parallel signal outputs of multiplexing channels having different timings.

The timing signal generating means 112 generates a timing signal having any phase of the sequentially different timings in the number of multiplexing channels and repeats in the period of input multiplexing signal.

The latch means 113 for demultiplexed signals generates a number of basic signal outputs corresponding to the number of multiplexing channels by latching outputs of the serial/parallel converting means 111 with the timing signal of timing signal generating means 112.

The control signal discriminating means 114 discriminates the multiplexing channel number of the basic signal outputs of a particular channel of the latch means 113 for demultiplexed signals and detects a difference between the discriminated multiplexing channel number and the multiplexing channel number corresponding to the particular channel.

Correspondence between the channel number at multiplexing and the channel number after demultiplexcan be established by controlling the phase a timing signal provided by the timing signal generating means 112 in accordance with a difference of such detected multiplexing channel numbers.

In the demultiplexing system of the present invention, control is carried out so that the channel number at multiplexing in the sending side corresponds to the channel number after demultiplexing. This is accomplished by discriminating the multiplex channel of the particular channel after checking the basic signal of the particular channel after demultiplexing and establishing the frame synchronization of such a basic signal. Then the phase of the timing signal is shifted in the timing signal generating means for channel synchronization so that such channel number matches the predetermined multiplexing channel number corresponding to the particular channel as a result of comparing the channel number of a predetermined channel.

Figure 9:
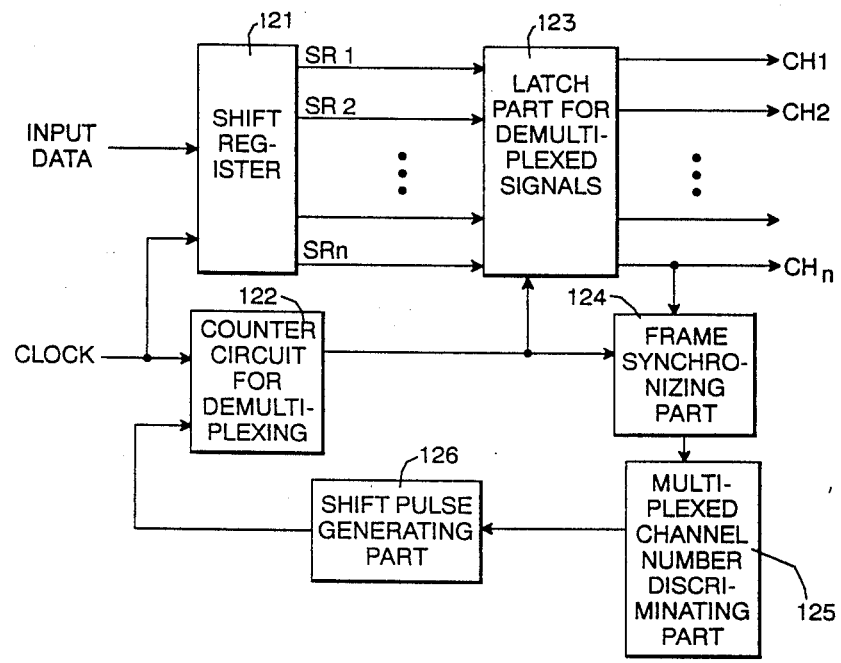
FIG. 9 is a detail structure of the second embodiment of the present invention.

The second embodiment of the present invention is further explained with reference to the detailed structure of the demultiplexing device of FIG. 9. In FIG. 9, 121 is a shift register, 122 is a counter circuit for demultiplexing, 123 is a latch part for channel synchronization, 124 is a frame synchronization part, 125 is a multiplexing channel number discriminating part, and 126 is a shift pulse generating part.

Figure 10A:
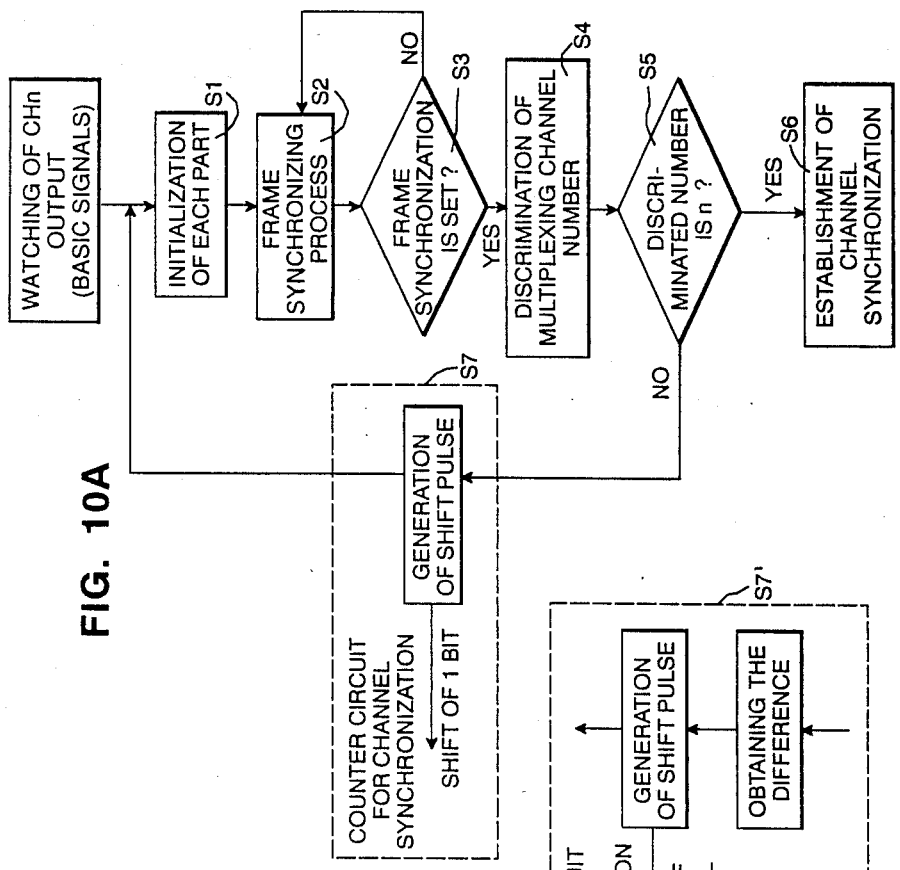
FIG. 10A is an operation flowchart of multiplex isolation in the embodiment of FIG. 9.

FIG. 10A is an operation flowchart for demultiplexing in the embodiment of FIG. 9.

The multiplexed input data is read into the shift register 121 in accordance with a clock which sequentially generates parallel outputs SR1, SR2, . . . , SRn by shifting the input one bit at a time. The counter circuit 22 for demultiplexing counts the clock and generates the timing signal which has any phase among the sequentially different timings equal to the number of multiplexing channels and repeats with the period of the input multiplexing signal.

The latch part 123 for channel synchronization generates a number of basic signal outputs CH1, CH2, . . . , CHn corresponding to the number of multitplexing channels. Three output are generated through speed conversion by latching outputs of shift register 121 with the timing signal of the counter circuit 122 for demultiplexing.

The frame synchronizing part 124 watches the basic signal outputs of particular channel, for instance, the channel CHn in the outputs of the channel synchronization latch part 123. Part 124 executes frame synchronization processing for frame synchronization using the frame synchronizing signal F indicated in FIG. 4 (step S2 in FIG. 10A) and repeats the processing until frame synchronization is established by checking whether the frame synchronization is set or not (step S3 in FIG. 10A).

When frame synchronization is set, the multiplexing channel number discriminating part 125 discriminates the multiplexing channel number of particular channel CHn (step S4 in FIG. 10A) and checks whether the discriminated multiplexing channel number is n or not (step S5 in FIG. 10A). When the discriminated multiplexing channel number is n, it means the channel synchronization is set (step S6 in FIG. 10A) and the processing in the circuit of FIG. 9 is completed.

On the other hand, if the discriminated multiplexing channel number is not n, the shift pulse generating part 126 generates the shift pulse to shift, for one bit, the phase of timing signal in the demultiplexing counter circuit 122 (step 7 in FIG. 10A). Next, the frame synchronization part 124 and multiplexing channel discriminating part 125 are initialized, and the frame synchronization process and multiplexing channel number discriminating process are repeated. Next it is determined whether the multiplexing channel number discriminated again is n or not (step S5 in FIG. 10A), when it is not n, the phase of timing signal is shifted for another one bit (step 7 in FIG. 10A), the same process is repeated until the discriminated multiplexing channel number becomes n, and thereby channel synchronization is completed.

Figure 10B:
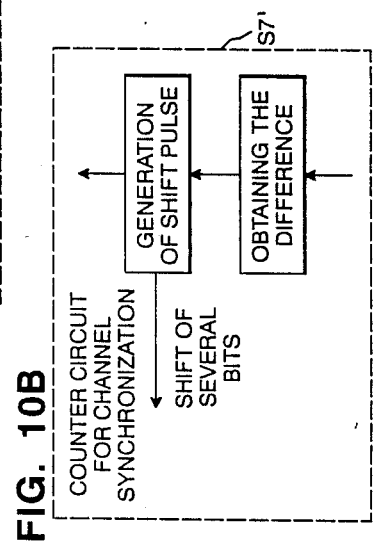
FIG. 10B is another embodiment of a part of the processing in the flowchart of FIG. 10A.

If the discriminated multiplexing channel number in the multiplexing channel discriminating part 125 is not n, the shift pulse generating part 126 a difference between the discriminated multiplexing channel number and n, and the phase of timing signal in the counter circuit 122 for demultiplexing is shifted as much as the number of bits equal to such difference (step S7' in FIG. 10B), thereby the channel synchronization may also be established.

As explained previously, the present invention ensures channel synchronizing of output basic signals having no phase deviation among the basic signals and respective channels are always multiplexed correctly in the sending side. Accordingly, demultiplexing can be realized stably even for broadband service in which a plurality of basic signals are used in comcatenation and in this case, the structure of device used can be simplified and also be reduced in size.

We claim:

1. A demultiplexing device of a synchronous multiplexing system which has a control signal including a multiplexing channel number in a basic signal frame, comprising:
    serial/parallel converting means, having an output, for converting an input multiplexed signal into parallel signals output via a plurality of multiplexing channel outputs having sequentially different time slots;
    control latch means for latching the parallel signal of a particular one of said multiplexing channel outputs of said serial/parallel converting means at a predetermined timing;
    control signal discriminating means for discriminating a multiplexing channel output number corresponding to said one of said multiplexing channel outputs and determining a difference between the multiplexing channel number of said control signal and the multiplexing channel output number;
    timing control means for generating a timing signal corresponding to the determined difference;
    demultiplexed signal latch means for latching the outputs of said serial/parallel converting means based on the timing signal and for generating outputs corresponding to the number of multiplexed channel outputs.

2. A demultiplexing device of a synchronous multiplexing system according to claim 1, wherein said serial/parallel converting means comprises a shift register which sequentially holds and shifts said input multiplexed signal.

3. A demultiplexing device of a synchronous multiplexing system according to claim 2, wherein said control latch means latches said control signal with a predetermined timing signal generated by a specified clock in a receiving side of said device.

4. A demultiplexing device of a synchronous multiplexing system according to claim 1, wherein said timing control means comprises a decoder and a selector, said selector selecting an output of said decoder in accordance with the multiplexing channel output number discriminated by said control signal discriminating means and applying such output to said demultiplexed signals latch means.

5. A demultiplexing device of a synchronous multiplexing system which has a control signal including a multiplexing channel number in a basic signal frame, comprising:
    serial/parallel converting means, having an output, for converting an input multiplexed signal into parallel signals output via a plurality of multiplexing channel outputs having sequentially different time slots;
    timing signal generating means, having sequentially different timings, the number of different timings being equal to the number of multiplexing channels, for generating a timing signal which repeats with the period of the input multiplexing signal;
    demultiplexing signal latch means for latching the output of said serial/parallel converting means with the timing signal of said timing signal generating means and for generating outputs corresponding to the number of multiplexing channel outputs;
    control signal discriminating means for discriminating a multiplexing channel number of a particular one of said multiplexing channels of said demultiplexed signal latch means and for detecting a difference between said discriminated multiplexing channel number and the multiplexing channel number corresponding to said particular one of said channels,
    whereby a phase of said timing signal is controlled in accordance with said difference.

6. A demultiplexing device of synchronous multiplexing system according to claim 5, wherein said serial/parallel converting means comprises a shift register which sequentially holds and shifts said input multiplexed signal.

7. A demultiplexing device of synchronous multiplexing system according to claim 6, wherein said control signal discriminating means comprises a frame synchronizing part and a multiplexing channel number discriminating part and wherein said control signal generating means discriminates the channel number among said basic signals after establishing synchronization of the basic signal of a particular channel.

8. A demultiplexing device of synchronous multiplexing system according to claim 6, wherein said timing signal generating means is comprises:
    a counter circuit means for counting clock pulses using a specified clock signal supplied to said serial/parallel converting means and which generates a latch pulse supplied to said demultiplexed signals latch means with a specified interval; and shift pulse generating means for shifting a counting value of said counter circuit depending on the discrimination performed by said control sginal discriminating means.

9. A demultiplexing device of synchronous multiplexing system according to claim 8, wherein a pulse generated by said shift pulse generating means corresponds to one clock pulse supplied to the shift register of said serial/parallel converting means.

10. A demultiplexing device of synchronous multiplexing system according to claim 8, wherein a pulse generated by said shift pulse generating means corresponds to a number of clock pulses equal to said difference of channel numbers discriminated by said multiplexing channel number discriminating part.

11. A demultiplexer for demultiplexing a multiplexed basic signal frame, comprising:

converting means, having a plurality of outputs with each of said plurality of outputs being assigned a multiplexing channel output number and one of said plurality of outputs being a control output, for converting an input multiplexed signal into a plurality of parallel signals, each of said parallel signals having a multiplexing channel number, and outputting said parallel signals via said plurality of outputs;

control latch means, connected to said one of said plurality of outputs, for latching one of said parallel signals output from said control output at a predetermined timing;

discriminating means for determining the multiplexing channel number of the one of said parallel signals output from said control output, comparing the determined multiplexing channel number with the multiplexing channel output number of said control output, and outputting a multiplexing channel shift number corresponding to the difference between the multiplexing number of the one of said parallel signals output from said control output and the multiplexing channel output number of said control output;

timing control means for generating a timing signal corresponding to said difference; and demultiplexed signal latch means, having demultiplexed outputs with each output being assigned a demultiplexing channel output number, for latching said plurality of parallel signals and outputting said plurality of parallel signals so that said multiplexing channel number of each of said plurality of parallel signals corresponds to the multiplexing channel output number of said demultiplexed outputs.

* * * * *

UNITED STATES PATENT AND TRADEMARK OFFICE
CERTIFICATE OF CORRECTION

PATENT NO. : 4,977,558
DATED : DECEMBER 11, 1990
INVENTOR(S) : KAZUO IGUCHI ET AL.

It is certified that error appears in the above-identified patent and that said Letters Patent is hereby corrected as shown below:

```
Col. 2, line 37, after "synchronization" insert --for the
                       basic signal--.

Col. 4, line 29, after "a" (second occurrence) insert
                       --rate--.

Col. 7, line 26, after "126" insert --obtains a--.

Col. 8, line 63, "is" should be deleted".
```

Signed and Sealed this

Twenty-first Day of April, 1992

Attest:

HARRY F. MANBECK, JR.

*Attesting Officer*   *Commissioner of Patents and Trademarks*